United States Patent
Trivelpiece et al.

(10) Patent No.: US 11,436,420 B2
(45) Date of Patent: Sep. 6, 2022

(54) INCREASED POWER TAG READ CYCLE

(71) Applicant: Sensormatic Electronics, LLC, Boca Raton, FL (US)

(72) Inventors: Steve Edward Trivelpiece, Rancho Santa Margarita, CA (US); Adam S. Bergman, Boca Raton, FL (US); Eric Floyd Riggert, Trabuco Canyon, CA (US); Manuel A. Soto, Lake Worth, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 17/012,752

(22) Filed: Sep. 4, 2020

(65) Prior Publication Data

US 2021/0073484 A1 Mar. 11, 2021

Related U.S. Application Data

(60) Provisional application No. 62/897,248, filed on Sep. 6, 2019.

(51) Int. Cl.
*G06K 7/00* (2006.01)
*G06K 7/10* (2006.01)
*G06K 19/07* (2006.01)

(52) U.S. Cl.
CPC ....... *G06K 7/0008* (2013.01); *G06K 7/10356* (2013.01); *G06K 19/0724* (2013.01)

(58) Field of Classification Search
None
See application file for complete search history.

(56) References Cited

U.S. PATENT DOCUMENTS

| | | | | |
|---|---|---|---|---|
| 6,283,377 B1 * | 9/2001 | Takuma | ........... | G06K 19/07703 235/492 |
| 6,335,685 B1 * | 1/2002 | Schrott | ............. | G06K 19/0723 340/8.1 |
| 8,489,593 B2 * | 7/2013 | Malik | ................. | G06F 21/6245 707/730 |
| 8,844,829 B1 * | 9/2014 | Stonoha | ............. | G06K 7/10425 235/492 |

(Continued)

OTHER PUBLICATIONS

International Search Report and Written Opinion issued in International Patent Application No. PCT/US2020/049587 dated Nov. 24, 2020.

*Primary Examiner* — Muhammad Adnan
(74) *Attorney, Agent, or Firm* — ArentFox Schiff

(57) ABSTRACT

A radio frequency identification (RFID) system first interrogates, in a first mode, one or more particular target zones of the plurality of target zones including a given target zone. Each particular target zone is interrogated with one of the antennas at a time at a first power for the particular target zone. The RFID system monitors, upon first interrogating, for a trigger condition to occur. In response to the trigger condition not occurring, the RFID system continues the first interrogation in the first mode. In response to the trigger condition occurring, the RFID system second interrogates the given target zone in a second mode at a second power with a plurality of the antennas. The second power for the given target zone is greater in an aggregate across the second interrogating antennas than the first power for the given target zone

20 Claims, 12 Drawing Sheets

(56) References Cited

U.S. PATENT DOCUMENTS

| | | | | |
|---|---|---|---|---|
| 9,519,811 B1* | 12/2016 | Simon | | G06K 7/10306 |
| 9,817,982 B2* | 11/2017 | Saito | | G06F 21/32 |
| 9,967,753 B1* | 5/2018 | Jadunandan | | H04W 4/24 |
| 10,018,372 B2* | 7/2018 | Lemire | | G05B 15/02 |
| 10,894,213 B2* | 1/2021 | Tinari | | A63F 13/57 |
| 11,270,561 B1* | 3/2022 | Kelsch | | G08B 13/1481 |
| 2005/0264422 A1* | 12/2005 | Watanabe | | G06K 7/10178 |
| | | | | 343/700 R |
| 2006/0022815 A1* | 2/2006 | Fischer | | G06K 17/0029 |
| | | | | 340/505 |
| 2006/0176152 A1* | 8/2006 | Wagner | | G06K 7/0008 |
| | | | | 340/10.2 |
| 2007/0188318 A1* | 8/2007 | Cole | | G07C 9/28 |
| | | | | 340/572.1 |
| 2007/0232359 A1* | 10/2007 | Pinheiro | | H04B 7/0695 |
| | | | | 455/562.1 |
| 2008/0150692 A1* | 6/2008 | Missimer | | G06K 7/0008 |
| | | | | 340/10.1 |
| 2008/0297401 A1* | 12/2008 | Nishida | | G01S 3/18 |
| | | | | 342/147 |
| 2009/0278663 A1* | 11/2009 | Takeda | | G06K 17/00 |
| | | | | 340/10.1 |
| 2010/0176947 A1* | 7/2010 | Hall | | G08B 13/248 |
| | | | | 340/572.1 |
| 2010/0289623 A1* | 11/2010 | Roesner | | G06K 7/10435 |
| | | | | 340/10.3 |
| 2011/0050400 A1* | 3/2011 | Ho | | G06K 7/10029 |
| | | | | 340/10.42 |
| 2012/0044074 A1* | 2/2012 | Mulla | | G08B 13/2448 |
| | | | | 340/572.1 |
| 2012/0112918 A1* | 5/2012 | Dinh | | G01V 3/10 |
| | | | | 324/228 |
| 2012/0150456 A1* | 6/2012 | Aharoni | | B60K 15/0403 |
| | | | | 702/65 |
| 2013/0069776 A1* | 3/2013 | Haber | | B60R 25/403 |
| | | | | 340/463 |
| 2013/0222119 A1* | 8/2013 | Tietke | | G06K 7/10128 |
| | | | | 340/10.5 |
| 2014/0084060 A1* | 3/2014 | Jain | | G06Q 10/087 |
| | | | | 235/385 |
| 2014/0316561 A1* | 10/2014 | Tkachenko | | G06Q 10/087 |
| | | | | 700/236 |
| 2015/0269818 A1* | 9/2015 | Jain | | G08B 13/2488 |
| | | | | 340/572.1 |
| 2016/0049069 A1* | 2/2016 | Oliveira | | G08B 13/1427 |
| | | | | 340/539.11 |
| 2017/0110909 A1* | 4/2017 | Zeine | | H02J 50/90 |
| 2017/0215087 A1* | 7/2017 | Amizur | | G01S 3/48 |
| 2017/0270552 A1* | 9/2017 | Ellis | | H04N 7/181 |
| 2017/0288769 A1* | 10/2017 | Miller | | H04B 7/18515 |
| 2018/0034149 A1* | 2/2018 | Ohishi | | H01Q 13/206 |
| 2018/0278647 A1* | 9/2018 | Gabaev | | H04L 63/1458 |
| 2018/0324212 A1* | 11/2018 | Yan | | H04L 63/1433 |
| 2020/0043311 A1* | 2/2020 | Choe | | G08B 13/24 |
| 2020/0118093 A1* | 4/2020 | Ko | | H04L 9/3239 |
| 2020/0195309 A1* | 6/2020 | Sakurai | | G06K 7/10198 |
| 2020/0341439 A1* | 10/2020 | Valin | | H02S 40/44 |
| 2021/0097826 A1* | 4/2021 | Trivelpiece | | G08B 13/2482 |

* cited by examiner

| Session 0 | A | B | Energized persistence = indefinite<br>Non-energized persistence = 0 |
| Session 1 | A | B | 500ms <Energized persistence < 5s<br>500ms <Non-energized persistence < 5s |
| Session 2 | A | B | Energized persistence: indefinite<br>Non-energized persistence > 2s |
| Session 3 | A | B | Energized persistence: indefinite<br>Non-energized persistence > 2s |

FIG. 8

INCREASED POWER TAG READ CYCLE

CROSS-REFERENCE TO RELATED APPLICATIONS

This application claims the benefit of U.S. Provisional Application No. 62/897,248, entitled "System and Method for Selectively Establishing a High-Power Tag Read Cycle in an RFID Portal," filed Sep. 6, 2019, which is expressly incorporated by reference herein in its entirety.

BACKGROUND

Technical Field

The present disclosure relates generally to Electronic Article Surveillance (EAS). Examples related to EAS using a increased-power read cycles for radio Frequency Identification (RFID) EAS tags under certain circumstances.

Introduction

EAS systems are commonly used in retail stores and other settings to prevent the unauthorized removal of goods from a protected area. Typically, a detection system is configured at an exit from the protected area, which comprises one or more transmitters and antennas ("pedestals") capable of generating an electromagnetic field across the exit, known as the "interrogation zone." Articles to be protected are tagged with an EAS marker (such as an RFID tag) that, when active, generates a response signal when passed through this interrogation zone. An antenna and receiver in the same or another "pedestal" detects this response signal and generates an alarm.

A number of organizations have set standards for RFID tags. One type of RFID tag for which a standard has been established is known as an EPCglobal UHF Class 1 Generation 2 (hereinafter "EPC Gen2") type tags. These tags have certain well known characteristics.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

Examples of the technology disclosed herein include methods, systems, and tags of electronic article surveillance (CAS). Consider a radio frequency identification (RFID) system comprises a plurality of non-co-located interrogation antennas, each antenna independently controllable by the system to interrogate one or more of a plurality of target zones one target zone at a lime for a presence of RFID tags of the system in each interrogated target zone. In some example, the RFID system first interrogates, in a first mode, one or mote particular target zones of the plurality of target zones including a given target zone. Each particular target zone is interrogated with one of the antennas at a time at a first power for the particular target zone. The RFID system monitors, upon first interrogating, for a trigger condition to occur. In response to the trigger condition not occurring, the RFID system continues the first interrogation in the first mode. In response to the trigger condition occurring, the RFID system second interrogates the given target zone in a second mode at a second power with a plurality of the antennas. The second power for the given target zone is greater in an aggregate across the second interrogating antennas than the first power for the given target zone.

In some examples, monitoring includes detecting a number of RFID tags of the system during a given round, and the trigger condition comprises the number being over a first threshold. In some such examples the method includes second detecting, by the system in response to the second interrogating, a second number of RFID tags of the system. In such examples, for the second number greater than a second threshold, the RFID system ends the second interrogation in the second mode and third interrogating in the first mode.

In some examples, the given target zone is a portal zone between a first area and a second area. In some examples, the trigger condition includes an output of one or more non-RFID sensors of the system being over a threshold of the one or more non-RFID sensors In some examples, the trigger condition comprises a schedule In some examples at least one antenna of the second interrogating antennas is a steerable beam antenna under control of the system and not directed to the given target zone during the first interrogation.

To the accomplishment of the foregoing and related ends, the one or more aspects comprise the features hereinafter fully described and particularly pointed out in the claims The following description and the annexed drawings set forth in detail certain illustrative features of the one or more aspects. These features are indicative, however, of but a few of the various ways in which the principles of various aspects may be employed, and this description is intended to include all such aspects and their equivalents

BRIEF DESCRIPTION OF THE DRAWINGS

FIG. 8 is a chart illustrating session flags for RFID tags.

DETAILED DESCRIPTION

Figure 1:
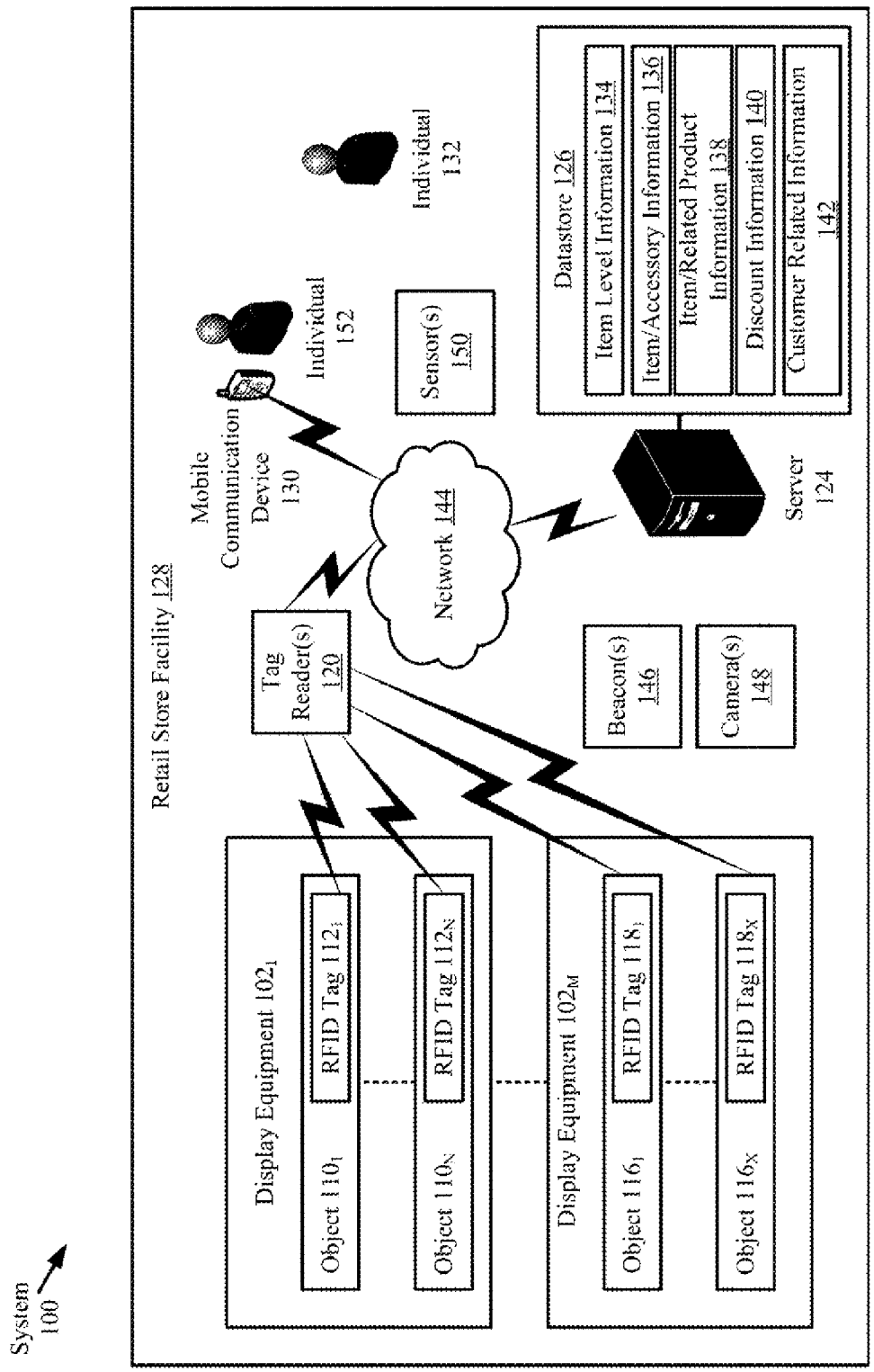
FIG. 1 is an illustration of an illustrative architecture for a system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes that come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages, and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

As used in this document, the singular form "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

These and other features of the present disclosure are discussed in detail below with regard to FIGS. 1-12.

Referring now to FIG. 1, there is provided a schematic illustration of an illustrative system 100 that is useful for understanding the present solution. The present solution is described herein in relation to a retail store environment. The present solution is not limited in this regard, and can be used in other environments. For example, the present solution can be used in distribution centers, factories and other commercial environments. Notably, the present solution can be employed in any environment in which objects and/or items need to be located and/or tracked.

The system 100 is generally configured to allow (a) improved inventory counts and surveillance of objects and/or items located within a facility, and (b) improved customer experiences. As shown in FIG. 1, system 100 comprises a Retail Store Facility ("RSF") 128 in which display equipment $102_1, \ldots, 102_M$ is disposed. The display equipment is provided for displaying objects (or items) $110_1$-$110_N$, $116_1$-$116_X$ to customers of the retail store. The display equipment can include, but is not limited to, shelves, article display cabinets, promotional displays, fixtures, and/or equipment se-curing areas of the RSF 128. The RSF can also include emergency equipment (not shown), checkout counters. Emergency equipment, checkout counters, video cameras, people counters, and conventional EAS systems are well known in the art, and therefore will not be described herein.

At least one tag reader 120 is provided to assist in counting and tracking locations the objects $110_1$-$110_N$, $116_1$-$116_X$ within the RSF 128. The tag reader 120 comprises an RFID reader configured to read RFID tags. RFID readers are well known in the art, and therefore will be described at a sufficient level of detail below for understanding of the claimed invention.

RFID tags $112_1$-$112_N$, $118_1$-$118_X$ are respectively attached or coupled to the objects $110_1$-$110_N$, $116_1$-$116_X$. This coupling is achieved via an adhesive (e.g., glue, tape, or sticker), a mechanical coupler (e.g., straps, clamps, snaps, etc.), a weld, chemical bond, or other means. The RFID tags can alternatively or additionally comprise dual-technology tags that have both EAS and RFID capabilities as described herein.

Notably, the tag reader 120 is strategically placed at a known location within the RSF 128, for example, at an exit/entrance. By correlating the tag reader's RFID tag reads and the tag reader's known location within the RSF 128, it is possible to determine the general location of objects $110_1, \ldots, 110_N, 116_1, \ldots, 116_X$ within the RSF 128. The tag reader's known coverage area also facilitates object location determinations. Accordingly, RFID tag read information and tag reader location information is stored in a datastore 126. This information can be stored in the datastore 126 using a server 124 and network 144 (e.g., an Intranet and/or Internet).

System 100 also comprises a Mobile Communication Device ("MCD") 130. MCD 130 includes, but is not limited to, a cell phone, a smart phone, a table computer, a personal digital assistant, and/or a wearable device (e.g., a smart watch). Each of the listed devices is well known in the art, and therefore will not be described herein. In accordance with some examples, the MCD 130 has a software application installed thereon that is operative to: facilitate the provision of various information 134-142 to the individual 152; facilitate a purchase transaction; and/or facilitate the detachment of the RFID tags $112_1$-$112_N$, $118_1$-$118_X$ from the objects $110_1, \ldots, 110_N, 116_1, \ldots, 116_X$; and/or facilitate the detachment of an anchored chain or cable from the objects $110_1, \ldots, 110_N, 116_1, \ldots, 116_X$.

The MCD 130 is generally configured to provide a visual and/or auditory output of item level information 134, accessory information 136, related product information 138, discount information 140 and/or customer related information 142. The item level information includes, but is not limited to, an item description, item nutritional information, a promotional message, an item regular price, an item sale price, a currency symbol, and/or a source of the item.

An accessory includes, but is not limited to, a useful auxiliary item that can be attached to or removed from an item (e.g., a drill bit or battery of a drill). The accessory information includes, but is not limited to, an accessory description, accessory nutritional information, a promotional message, an accessory regular price, an accessory sale price, a currency symbol, a source of the accessory, and/or an accessory location in the facility.

A related product includes, but is not limited to, a product that can be used in conjunction with or as an alternative to another product (e.g., diaper rash cream which can be used when changing a diaper, or a first diaper can be used as an alternative to another diaper). The related product information includes, but is not limited to, a related product description, related product nutritional information, a promotional message, a related product regular price, a related product sale price, a currency symbol, a source of the related product, and/or a related product location in the facility.

The discount information can include, but is not limited to, a discount price for a product based on a loyalty level or other criteria. The customer related information includes, but is not limited to, customer account numbers, customer identifiers, usernames, passwords, payment information, loyalty levels, historical purchase information, and/or activity trends.

The item level information, accessory information, related product information and/or discount in-formation can be output in a format selected from a plurality of formats based on a geographic location of the item, a location of the MCD, a date, and/or an item pricing status (i.e., whether the item is on sale). In a display context, the format is defined by a font parameter, a color parameter, a brightness parameter, and/or a display blinking parameter. In an auditory context, the format is defined by a volume parameter, a voice tone parameter, and/or a male/female voice selected parameter.

The MCD 130 can also be configured to read barcodes and/or RFID tags. Information obtained from the barcode and/or RFID tag reads may be communicated from the MCD 130 to the server 124 via network 144. Similarly, the stored information 134-142 is provided from the server 124 to the MCD 130 via network 144. The network 144 includes an Intranet and/or the Internet.

Server 124 can be local to the facility 128 as shown in FIG. 1 or remote from the facility 128. Server 124 will be described in more detail below in relation to FIG. 4. Still, it should be understood that server 124 is configured to: write data to and read data from datastore 126, RFID tags $112_1$-$112_N$, $118_1$-$118_X$, and/or MCD 130; perform language and currency conversion operations using item level information and/or accessory information obtained from the datastore, RFID tags, and/or MCD; perform data analytics based on inventory information, tag read information, MCD tacking information, and/or information 134-142; perform image processing using images captured by camera(s) 148; and/or determine locations of RFID tags and/or MCDs in the RSF 128 using beacon(s) 146, tag reader 120 or other devices having known locations and/or antenna patterns.

In some examples, one or more beacons 146 transmitting an RF signal (second RF signal that is non-RFID) other than the RFID interrogation signal are placed to cover a zone of interest also covered by a tag reader 120 placed to cover an RFID interrogation zone, e.g., at a portal of the retail facility 128. The system 100 can detect and derive any number of relevant indicators based on second RF signal. The tag 112/118 response to the second RF signal is analyzed and compared to data collected by the RFID signal response that occurred concurrently with the tag's passage through the portal.

The server 124 facilitates updates to the information 134-142 output from the MCD 130. Such information updating can be performed periodically, in response to instructions received from an associate (e.g., a retail store employee 132), in response to a detected change in the item level, accessory and/or related product information, in response to a detection that an individual is in proximity to an RFID tag, and/or in response to any motion or movement of the RFID tag. For example, if a certain product is placed on sale, then the sale price for that product is transmitted to MCD 130 via network 144 and/or RFID tag. The sale price is then output from the MCD 130. The present solution is not limited to the particulars of this example.

Although a single MCD 130 and/or a single server 124 is(are) shown in FIG. 1, the present solution is not limited in this regard. It is contemplated that more than one computing device can be implemented. In addition, the present solution is not limited to the illustrative system architecture described in relation to FIG. 1.

During operation of system 100, the content displayed on the display screen of the MCD 130 is dynamically controlled based upon various tag or item related information and/or customer related information (e.g., mobile device identifier, mobile device location in RSF 128, and/or customer loyalty level). Tag or item level information includes, but is not limited to, first information indicating that an RFID tag is in motion or that an object is being handled by an individual 152, second information indicating a current location of the RFID tag and/or the MCD 130, third information indicating an accessory or related product of the object to which the moving RFID tag is coupled, and/or fourth information indicating the relative locations of the accessory and the moving RFID tag and/or the relative locations of the related product and the moving RFID tag. The first, second and fourth information can be derived based on sensor data generated by sensors local to the RFID tag. Accordingly, the RFID tags $112_1$-$112_N$, $118_1$-$118_X$ include one or more sensors to detect their current locations, detect any individual in proximity thereto, and/or detect any motion or movement thereof. The sensors include, but are not limited to, an Inertial Measurement Unit ("IMU"), a vibration sensor, a light sensor, an accelerometer, a gyroscope, a proximity sensor, a microphone, and/or a beacon communication device. The third information can be stored local to the RFID tag(s) or in a remote datastore 126 as information 136, 138.

In some scenarios, the MCD 130 facilitates the server's 124 (a) detection of when the individual 152 enters the RSF 128, (b) tracking of the individual's movement through the RSF, (c) detection of when the individual is in proximity to an object to which an RFID tag is coupled, (d) determination that an RFID tag is being handled or moved by the individual based on a time stamped pattern of MCD movement and a timestamped pattern of RFID tag movement, and/or (e) determination of an association of moving RFID tags and the individual.

When a detection is made that an RFID tag is being moved, the server 124 can, in some scenarios, obtain customer related information (such as a loyalty level) 142 associated with the individual 152. This information can be obtained from the individual's MCD 130 and/or the datastore 126. The customer related information 142 is then used to retrieve discount information 140 for the object to which the RFID tag is coupled. The retrieved discount information is then communicated from the server 124 to the individual's MCD 130. The individual's MCD 130 can output the discount information in a visual format and/or an auditory format. Other information may also be communicated from the server 124 to the individual's MCD 130. The other information includes, but is not limited to, item level information, accessory information, and/or related product information.

In those or other scenarios, a sensor embedded in the RFID tag detects when an individual is handling the object to which the RFID tag is coupled. When such a detection is made, the RFID tag retrieves the object's unique identifier from its local memory, and wirelessly communicates the same to the tag reader 120. The tag reader 120 then passes the information to the server 124. The server 124 uses the object's unique identifier and the item/accessory relationship in-formation (e.g., table) 136 to determine if there are any accessories associated therewith. If no accessories exist for the object, the server 124 uses the item level information 134 to determine one or more characteristics of the object. For example, the object includes a product of a specific brand. The server 124 then uses the item/related product information (e.g., table) 138 to identify: other products of the same type with the same characteristics; and/or other products that are typically used in conjunction with the object. Related product information for the identified related products is then retrieved and provided to the MCD 130. The MCD 130 can output the related product information in a visual format and/or an auditory format. The individual 152 can perform user-software interactions with the MCD 130 to obtain further information obtain the related product of interest. The present solution is not limited to the particulars of this scenario.

Figure 2:
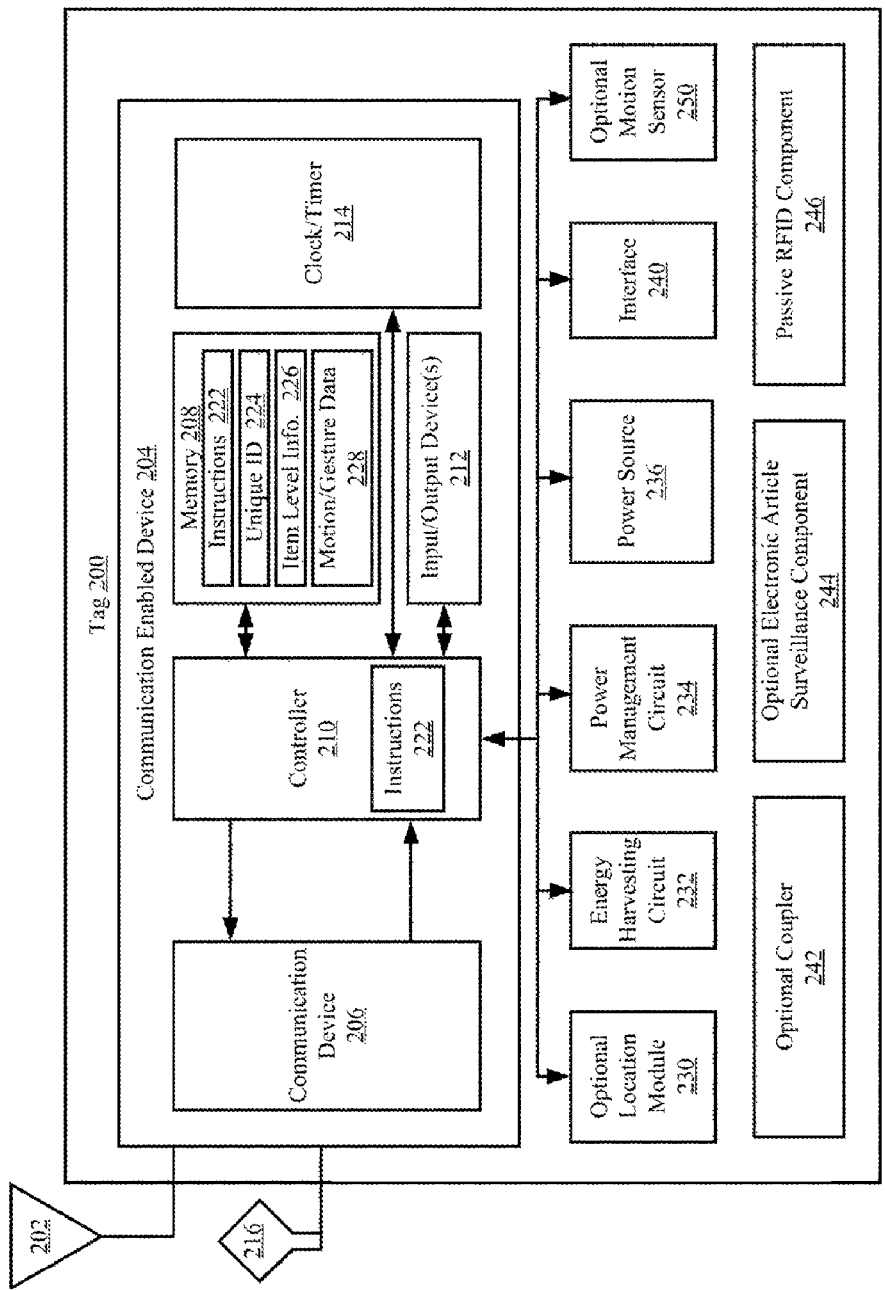
FIG. 2 is an illustration of an illustrative architecture for a tag.

Referring now to FIG. 2, there is an illustration of an illustrative architecture for a tag 200. RFID tags $112_1, \ldots, 112_N, 118_1, \ldots, 118_X$ are the same as or similar to tag 200. As such, the discussion of tag 200 is sufficient for understanding the RFID tags $112_1, \ldots, 112_N, 118_1, \ldots, 118_X$ of FIG. 1. Tag 200 is generally configured to perform operations to (a) minimize power usage so as to extend a power source's life (e.g., a battery or a capacitor), (b) minimize collisions with other tags so that the tag of interest can be seen at given times, (c) optimize useful information within an inventory system (e.g., communicate useful change information to a tag reader), and/or (d) optimize local feature functions.

The tag 200 can include more or less components than that shown in FIG. 2. However, the components shown are sufficient to disclose an illustrative embodiment implementing the present solution. Some or all of the components of the tag 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 represents a representative tag 200 configured to facilitate improved inventory management/surveillance and customer experience. In this regard, the tag 200 is configured for allowing data to be exchanged with an external device (e.g., tag reader 120 of FIG. 1, a beacon 146 of FIG. 1, a Mobile Communication Device ("MCD") 130 of FIG. 1, and/or server 124 of FIG. 1) via wireless communication technology. The wireless communication technology can include, but is not limited to, a Radio Frequency Identification ("RFID") technology, a Near Field Communication ("NFC") technology, and/or a Short Range Communication ("SRC") technology. For example, one or more of the following wireless communication technologies (is)are employed: Radio Frequency ("RF") communication technology; Bluetooth technology (including Bluetooth Low Energy (LE)); WiFi technology; beacon technology; and/or LiFi technology. Each of the listed wireless communication technologies is well known in the art, and therefore will not be described in detail herein. Any known or to be known wireless communication technology or other wireless communication technology can be used herein without limitation.

The components 206-214 shown in FIG. 2 may be collectively referred to herein as a communication enabled device 204, and include a memory 208 and a clock/timer 214. Memory 208 may be a volatile memory and/or a non-volatile memory. For example, the memory 208 can include, but is not limited to, Random Access Memory ("RAM"), Dynamic RAM ("DRAM"), Static RAM ("SRAM"), Read Only Memory ("ROM"), and flash memory. The memory 208 may also comprise unsecure memory and/or secure memory.

In some scenarios, the communication enabled device 204 comprises a Software Defined Radio ("SDR"). SDRs are well known in the art, and therefore will not be described in detail herein. However, it should be noted that the SDR can be programmatically assigned any communication protocol that is chosen by a user (e.g., RFID, WiFi, LiFi, Bluetooth, BLE, Nest, ZWave, Zigbee, etc.). The communication protocols are part of the device's firmware and reside in memory 208. Notably, the communication protocols can be downloaded to the device at any given time. The initial/default role (being an RFID, WiFi, LiFi, etc. tag) can be assigned at the deployment thereof. If the user desires to use another protocol later, the user can remotely change the communication protocol of the deployed tag 200. The update of the firmware, in case of issues, can also be performed remotely.

As shown in FIG. 2, the communication enabled device 204 comprises at least one antenna 202, 216 for allowing data to be exchanged with the external device via a wireless communication technology (e.g., an RFID technology, an NFC technology, a SRC technology, and/or a beacon technology). The antenna 202, 216 is configured to receive signals from the external de-vice and/or transmit signals generated by the communication enabled device 204. The antenna 202, 216 can comprise a near-field or far-field antenna. The antennas include, but are not limited to, a chip antenna or a loop antenna.

The communication enabled device 204 also comprises a communication device (e.g., a transceiver or transmitter) 206. Communication devices (e.g., transceivers or transmitters) are well known in the art, and therefore will not be described herein. However, it should be understood that the communication device 206 generates and transmits signals (e.g., RF carrier signals) to external devices, as well as receives signals (e.g., RF signals) transmitted from external devices. In this way, the communication enabled device 204 facilitates the registration, identification, location and/or tracking of an item (e.g., object 110 or 112 of FIG. 1) to which the tag 200 is coupled.

The communication enabled device 204 is configured so that it: communicates (transmits and receives) in accordance with a time slot communication scheme; and selectively enables/disables/bypasses the communication device (e.g., transceiver) or at least one communications operation based on output of a motion sensor 250. In some scenarios, the communication enabled device 204 selects: one or more time slots from a plurality of time slots based on the tag's unique identifier 224 (e.g., an Electronic Product Code ("EPC")); and/or determines a Window Of Time ("WOT") during which the communication device (e.g., transceiver)

206 is to be turned on or at least one communications operation is be enabled subsequent to when motion is detected by the motion sensor 250. The WOT can be determined based on environmental conditions (e.g., humidity, temperature, time of day, relative distance to a location device (e.g., beacon or location tag), etc.) and/or system conditions (e.g., amount of traffic, interference occurrences, etc.). In this regard, the tag 200 can include additional sensors not shown in FIG. 2.

The communication enabled device 204 also facilitates the automatic and dynamic modification of item level information 226 that is being or is to be output from the tag 200 in response to certain trigger events. The trigger events can include, but are not limited to, the tag's arrival at a particular facility (e.g., RSF 128 of FIG. 1), the tag's arrival in a particular country or geographic region, a date occurrence, a time occurrence, a price change, and/or the reception of user instructions.

Item level information 226 and a unique identifier ("ID") 224 for the tag 200 can be stored in memory 208 of the communication enabled device 204 and/or communicated to other external devices (e.g., tag reader 120 of FIG. 1, beacon 146 of FIG. 1, MCD 130 of FIG. 1, and/or server 124 of FIG. 1) via communication device (e.g., transceiver) 206 and/or interface 240 (e.g., an Internet Protocol or cellular network interface). For example, the communication enabled de-vice 204 can communicate information specifying a timestamp, a unique identifier for an item, item description, item price, a currency symbol and/or location information to an external device. The external device (e.g., server or MCD) can then store the information in a database (e.g., database 126 of FIG. 1) and/or use the information for various purposes.

The communication enabled device 204 also comprises a controller 210 (e.g., a CPU) and in-put/output devices 212. The controller 210 can execute instructions 222 implementing methods for facilitating inventory counts and management. In this regard, the controller 210 includes a processor (or logic circuitry that responds to instructions) and the memory 208 includes a computer-readable storage medium on which is stored one or more sets of instructions 222 (e.g., software code) configured to implement one or more of the methodologies, procedures, or functions described herein. The instructions 222 can also reside, completely or at least partially, with-in the controller 210 during execution thereof by the tag 200. The memory 208 and the controller 210 also can constitute machine-readable media. The term "machine-readable media," as used here, refers to a single medium or multiple media (e.g., a centralized or distributed database, and/or associated caches and servers) that store the one or more sets of instructions 222. The term "machine-readable media," as used here, also refers to any medium that is capable of storing, encoding, or carrying a set of instructions 222 for execution by the tag 200 and that cause the tag 200 to perform any one or more of the methodologies of the present disclosure.

The input/output devices can include, but are not limited to, a display (e.g., an E Ink display, an LCD display and/or an active matrix display), a speaker, a keypad, and/or light emitting diodes. The display is used to present item level information in a textual format and/or graphical format. Similarly, the speaker may be used to output item level information in an auditory format. The speaker and/or light emitting diodes may be used to output alerts for drawing a person's attention to the tag 200 (e.g., when motion thereof has been detected) and/or for notifying the person of a particular pricing status (e.g., on sale status) of the item to which the tag is coupled.

The clock/timer 214 is configured to determine a date, a time, and/or an expiration of a pre-defined period of time. Technique for determining these listed items are well known in the art, and therefore will not be described herein. Any known or to be known technique for determining these listed items can be used herein without limitation.

The tag 200 also comprises an optional location module 230. The location module 230 is generally configured to determine the geographic location of the tag at any given time. For example, in some scenarios, the location module 230 employs Global Positioning System ("GPS") technology and/or Internet based local time acquisition technology. The present solution is not limited to the particulars of this example. Any known or to be known technique for determining a geographic lo-cation can be used herein without limitation including relative positioning within a facility or structure.

The optional coupler 242 is provided to securely or removably couple the tag 200 to an item (e.g., object 110 or 112 of FIG. 1). The coupler 242 includes, but is not limited to, a mechanical coupling means (e.g., a strap, clip, clamp, snap) and/or adhesive (e.g., glue or sticker). The coupler 242 is optional since the coupling can be achieved via a weld and/or chemical bond.

The tag 200 can also include a power source 236, an optional Electronic Article Surveillance ("EAS") component 244, and/or a passive/active/semi-passive RFID component 246. Each of the listed components 236, 244, 246 is well known in the art, and therefore will not be described herein. Any known or to be known battery, EAS component and/or RFID component can be used herein without limitation. The power source 236 can include, but is not limited to, a rechargeable battery and/or a capacitor.

As shown in FIG. 2, the tag 200 further comprises an energy harvesting circuit 232 and a power management circuit 234 for ensuring continuous operation of the tag 200 without the need to change the rechargeable power source (e.g., a battery). In some scenarios, the energy harvesting circuit 232 is configured to harvest energy from one or more sources (e.g., heat, light, vibration, magnetic field, and/or RF energy) and to generate a relatively low amount of output power from the harvested energy. By employing multiple sources for harvesting, the device can continue to charge despite the depletion of a source of energy. Energy harvesting circuits are well known in the art, and therefore will not be described herein. Any known or to be known energy harvesting circuit can be used herein without limitation.

As noted above, the tag 200 may also include a motion sensor 250. Motion sensors are well known in the art, and therefore will not be described herein. Any known or to be known motion sensor can be used herein without limitation. For example, the motion sensor 250 includes, but is not limited to, a vibration sensor, an accelerometer, a gyroscope, a linear motion sensor, a Passive Infrared ("PIR") sensor, a tilt sensor, and/or a rotation sensor.

The motion sensor 250 is communicatively coupled to the controller 210 such that it can notify the controller 210 when tag motion is detected. The motion sensor 250 also communicates sensor data to the controller 210. The sensor data is processed by the controller 210 to determine whether or not the motion is of a type for triggering enablement of the communication device (e.g., transceiver) 206 or at least one communications operation. For example, the sensor data can be compared to stored motion/gesture data 228 to determine if a match exists there-between. More specifically, a motion/gesture pattern specified by the sensor data can be compared to a plurality of motion/gesture patterns specified by the stored motion/gesture data 228. The plurality of motion/gesture patterns can include, but are not limited to, a motion pattern for walking, a motion pattern for running, a motion pattern for vehicle transport, a motion pattern for vibration caused by equipment or machinery in proximity to the tag (e.g., an air conditioner or fan), a gesture for requesting assistance, a gesture for obtaining additional product information, and/or a gesture for product purchase. The type of movement (e.g., vibration or being carried) is then determined based on which stored motion/gesture data matches the sensor data. This feature of the present solution allows the tag 200 to selectively enable the communication device (e.g., transceiver) or at least one communications operation only when the tag's location within a facility is actually being changed (e.g., and not when a fan is causing the tag to simply vibrate).

In some scenarios, the tag 200 can be also configured to enter a sleep state in which at least the motion sensor triggering of communication operations is disabled. This is desirable, for example, in scenarios when the tag 200 is being shipped or transported from a distributor to a customer. In those or other scenarios, the tag 200 can be further configured to enter the sleep state in response to its continuous detection of motion for a given period of time. The tag can be transitioned from its sleep state in response to expiration of a defined time period, the tag's reception of a control signal from an external device, and/or the tag's detection of no motion for a period of time.

The power management circuit 234 is generally configured to control the supply of power to components of the tag 200. In the event all of the storage and harvesting resources deplete to a point where the tag 200 is about to enter a shutdown/brownout state, the power management circuit 234 can cause an alert to be sent from the tag 200 to a remote device (e.g., tag reader 120 or server 124 of FIG. 1). In response to the alert, the remote device can inform an associate (e.g., a store employee 132 of FIG. 1) so that (s)he can investigate why the tag 200 is not recharging and/or holding charge.

The power management circuit 234 is also capable of redirecting an energy source to the tag's 200 electronics based on the energy source's status. For example, if harvested energy is sufficient to run the tag's 200 function, the power management circuit 234 confirms that all of the tag's 200 storage sources are fully charged such that the tag's 200 electronic components can be run directly from the harvested energy. This ensures that the tag 200 always has stored energy in case harvesting source(s) disappear or lesser energy is harvested for reasons such as drop in RF, light or vibration power levels. If a sudden drop in any of the energy sources is detected, the power management circuit 234 can cause an alert condition to be sent from the tag 200 to the remote device (e.g., tag reader 120 or server 124 of FIG. 1). At this point, an investigation may be required as to what caused this alarm. Accordingly, the remote device can inform the associate (e.g., a store employee 132 of FIG. 1) so that (s)he can investigate the issue. It may be that other merchandise are obscuring the harvesting source or the item is being stolen.

The present solution is not limited to that shown in FIG. 2. The tag 200 can have any architecture provided that it can perform the functions and operations described herein. For example, all of the components shown in FIG. 2 can comprise a single device (e.g., an Integrated Circuit ("IC")). Alternatively, some of the components can comprise a first tag element (e.g., a Commercial Off The Shelf ("COTS") tag) while the remaining components comprise a second tag element communicatively coupled to the first tag element. The second tag element can provide auxiliary functions (e.g., motion sensing, etc.) to the first tag element. The second tag element may also control operational states of the first tag element. For example, the second tag element can selectively (a) enable and disable one or more features/operations of the first tag element (e.g., transceiver operations), (b) couple or decouple an antenna to and from the first tag element, (c) by-pass at least one communications device or operation, and/or (d) cause an operational state of the first tag element to be changed (e.g., cause transitioning the first tag element between a power save mode and non-power save mode). In some scenarios, the operational state change can be achieved by changing the binary value of at least one state bit (e.g., from 0 to 1, or vice versa) for causing certain communication control operations to be performed by the tag 200. Additionally or alternatively, a switch can be actuated for creating a closed or open circuit. The pre-sent solution is not limited in this regard.

Figure 3:
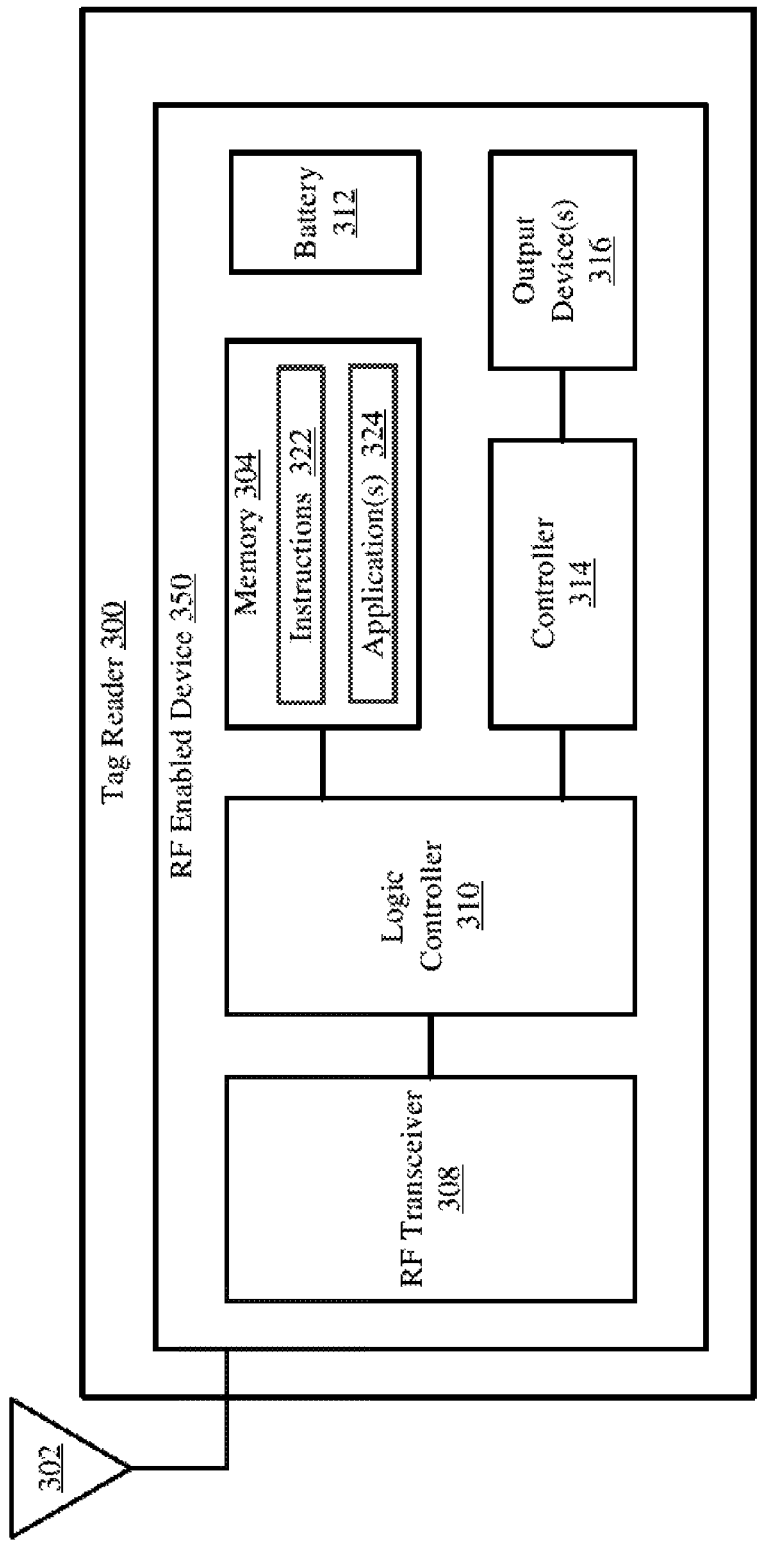
FIG. 3 is an illustration of an illustrative architecture for a tag reader.

Referring now to FIG. 3, there is provided a detailed block diagram of an exemplary architecture for a tag reader 300. Tag reader 120 of FIG. 1 is the same as or similar to tag reader 200. As such, the discussion of tag reader 200 is sufficient for understanding tag reader 120.

Tag reader 300 may include more or less components than that shown in FIG. 3. However, the components shown are sufficient to disclose an illustrative embodiment implementing the present solution. Some or all of the components of the tag reader 300 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 3 represents an illustration of a representative tag reader 300 configured to facilitate improved inventory counts and management within an RSF (e.g., RSF 128 of FIG. 1). In this regard, the tag reader 300 comprises an RF enabled device 350 for allowing data to be exchanged with an external device (e.g., RFID tags $112_1, \ldots, 112_N, 118_1, \ldots, 118_X$ of FIG. 1) via RF technology. The components 304-316 shown in FIG. 3 may be collectively referred to herein as the RF enabled device 350, and may include a power source 312 (e.g., a battery) or be connected to an external power source (e.g., an AC mains).

The RF enabled device 350 comprises one or more antennas 302 for allowing data to be exchanged with the external device via RF technology (e.g., RFID technology or other RF based technology). The external device may comprise RFID tags $112_1, \ldots, 112_N, 118_1, \ldots, 118_X$ of FIG. 1. In this case, the antenna 302 is configured to transmit RF carrier signals (e.g., interrogation signals) to the listed external devices, and/or transmit data response signals (e.g., authentication reply signals or an RFID response signal) generated by the RF enabled device 350. In this regard, the RF enabled device 350 comprises an RF transceiver 308. RF transceivers are well known in the art, and therefore will not be described herein. However, it should be understood that the RF transceiver 308 receives RF signals including information from the transmitting device, and forwards the same to a logic controller 310 for extracting the information therefrom.

The extracted information can be used to determine the presence, location, and/or type of movement of an RFID tag within a facility (e.g., RSF 128 of FIG. 1). Accordingly, the logic controller 310 can store the extracted information in memory 304, and execute algorithms using the extracted information. For example, the logic controller 310 can correlate tag reads with beacon reads to determine the location of the RFID tags within the facility. The logic controller 310 can also perform pattern recognition operations using sensor data received from RFID tags and comparison operations between recognized patterns and pre-stored patterns. The logic controller 310 can further select a time slot from a plurality of time slots based on a tag's unique identifier (e.g., an EPC), and communicate information specifying the selected time slot to the respective RFID tag. The logic controller 310 may additionally determine a WOT during which a given RFID tag's communication device (e.g., transceiver) or operation(s) is(are) to be turned on when motion is detected thereby, and communicate the same to the given RFID tag. The WOT can be determined based on environmental conditions (e.g., temperature, time of day, etc.) and/or system conditions (e.g., amount of traffic, interference occurrences, etc.). Other operations performed by the logic controller 310 will be apparent from the following discussion.

Notably, memory 304 may be a volatile memory and/or a non-volatile memory. For example, the memory 304 can include, but is not limited to, a RAM, a DRAM, an SRAM, a ROM, and a flash memory. The memory 304 may also comprise unsecure memory and/or secure memory. The phrase "unsecure memory," as used herein, refers to memory configured to store data in a plain text form. The phrase "secure memory," as used herein, refers to memory configured to store data in an encrypted form and/or memory having or being disposed in a secure or tamper-proof enclosure.

Instructions 322 are stored in memory for execution by the RF enabled device 350 and that cause the RF enabled device 350 to perform any one or more of the methodologies of the present disclosure. The instructions 322 are generally operative to facilitate determinations as to whether or not RFID tags are present within a facility, where the RFID tags are located within a facility, which RFID tags are in motion at any given time. Other functions of the RF enabled device 350 will become apparent as the discussion progresses.

Figure 4:
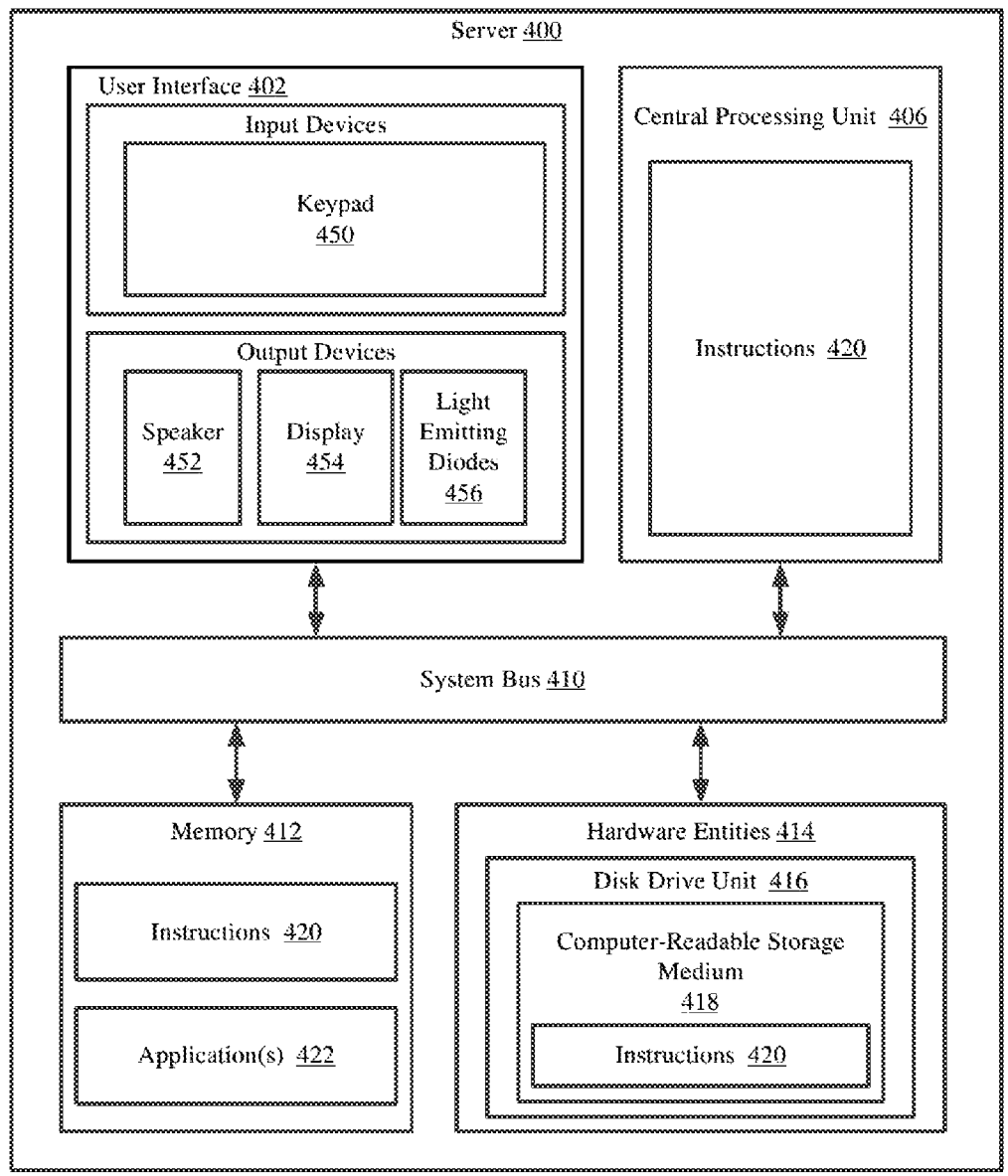
FIG. 4 is an illustration of an illustrative architecture for a server.

Referring now to FIG. 4, there is provided a detailed block diagram of an exemplary architecture for a server 400. Server 124 of FIG. 1 is the same as or substantially similar to server 400. As such, the following discussion of server 400 is sufficient for understanding server 124.

Notably, the server 400 may include more or less components than those shown in FIG. 4. However, the components shown are sufficient to disclose an illustrative embodiment implementing the present solution. The hardware architecture of FIG. 4 represents one embodiment of a representative server configured to facilitate inventory counts, inventory management, and improved customer experiences.

Some or all the components of the server 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to, and/or programmed to perform one or more of the methodologies, procedures, or functions described herein.

As shown in FIG. 4, the server 400 comprises a user interface 402, a CPU 406, a system bus 410, a memory 412 connected to and accessible by other portions of server 400 through system bus 410, and hardware entities 414 connected to system bus 410. The user interface can include input devices (e.g., a keypad 450) and output devices (e.g., speaker 452, a display 454, and/or light emitting diodes 456), which facilitate user-software interactions for controlling operations of the server 400.

At least some of the hardware entities 414 perform actions involving access to and use of memory 412, which can be a RAM, a disk driver, and/or a Compact Disc Read Only Memory ("CD-ROM"). Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, with-in the memory 412 and/or within the CPU 406 during execution thereof by the server 400. The memory 412 and the CPU 406 also can constitute machine-readable media. The term "machine-readable media," as used here, refers to a single medium or multiple media (e.g., a centralized or distributed database, and/or associated caches and servers) that store the one or more sets of instructions 420. The term "machine-readable media," as used here, also refers to any medium that is capable of storing, encoding, or carrying a set of instructions 420 for execution by the server 400 and that cause the server 400 to perform any one or more of the methodologies of the present disclosure.

In some scenarios, the hardware entities 414 include an electronic circuit (e.g., a processor) programmed for facilitating the provision of a three-dimensional map showing locations of RFID tags within a facility and/or changes to said locations in near real-time. In this regard, it should be understood that the electronic circuit can access and run a software application 422 installed on the server 400. The software application 422 is generally operative to facilitate: the determination of RFID tag locations within a facility; the direction of travel of RFID tags in motion; and the mapping of the RFID tag locations and movements in a virtual three-dimensional space.

In those or other scenarios, the hardware entities 414 include an electronic circuit (e.g., a processor) programmed for facilitating item inventorying, merchandise sale, and/or customer satisfaction with a shopping experience. In this regard, the electronic circuit can access and run an inventorying software application 422 and an MCD display software application 422 installed on the server 400. The software applications 422 are collectively generally operative to: obtain item level information and/or other information from MCDs and RFID tags; program item level information, accessory information, related product information and/or discount information onto RFID tags and/or MCDs; convert the language, pricing and/or currency symbol of item level information, accessory information, related product information and/or discount information; facilitate registration of RFID tags and MCDs with an enterprise system; and/or determine when MCD display update actions need to be taken based on RFID tag information. Other functions of the software applications 422 will become apparent as the discussion progresses. Such other functions can relate to tag reader control and/or tag control.

An RFID exit portal can track tagged items which located near the point of exit, and also those items which are in a defined portal zone, and those items which are in motion passing through the RFID portal. Conventional RFID portals identify the direction of RFID tags crossing a portal transition defined by a choke point through which items must pass when they move from one defined area to a second defined area. In many implementations, an RFID portal consists at minimum of two separate antennas and a RFID reader. The tag directionality is easily determined by the order of the reads. A tag read by a first antenna and then by the second antenna is likely moving from the first to second antenna. However, this implementation requires multiple read zones with separated mounting points and cannot be applied to all use cases. Mounted antennas of various heights can be used, including ceiling and floor installations.

RFID portals can also use beam steerable antennas to detect the presence of RFID tags in different locations as they move through a portal zone. In a conventional configuration, the minimum setup is one RFID reader and one beam steerable antenna. In such scenarios, the physical separation between multiple antennas is no longer needed to determine tag directionality.

Typical RFID portals can detect and read RFID tags that are moving between defined zones. In practice, situations arise where there are tagged items which are being removed from the premises without authorization, e.g. by shoplifters who have not purchased the items they are taking through the exit In these situations, a person attempting to transport tagged items through the portal may attempt to shield the security lags from the portal reader's interrogation signals.

In conventional systems the proximity of the tags to the body can partially or completely shield the tags from detection by the RFID reader. The human body tends to shield RFID tags operating at 860-960 MHz from detection. Keeping RFID tags close to the body can interfere with the ability of the portal reader to detect and read RFID tags, a defeat lactic know n by thieves. For example, it is not uncommon for a thief to attempt to exit a store wearing two or three stolen garments with RFID tags. Thieves may attempt to hide tags under their armpits, and in which case there will not be sufficient RF energy to power on the tag.

Some approaches to address these problems seek to prevent multiple readers from interfering with each other, and also to maximize the number of tags in the field of view. In order to further improve on that system, the technology disclosed herein targets detection of "hard to read" RFID tags. This targeted detection involves intermittent high-power reading of certain tags, where the RF power level applied to a certain groups of RFID antennas can be selectively increased, where the read power is further enhanced by the one of more readers antennas focused on a given target zone.

The design of an RFID portal requires consideration of several different competing requirements. The portal should be able to (1) inventory all tags crossing the portal, (2) provide enough reads per crossing tag to determine directionality of movement, (3) inventory all static tags surrounding the portal, and (4) detect and focus on crossing tags. This is not a trivial exercise. A simple method constantly attempting to inventors all tags in field of view of each antenna will fail to teach the requirements. In addition, examples of the technology disclosed herein address a further requirement, namely targeted power increases to detect hard-to-read tags which may be deliberately concealed.

A common practice for purposes of trying to reach these goal can involve interrogating tags using the dual-target mode in one of the latched sessions S1, S2 or S3. In the dual-target mode, each of the tags will be read continuously regardless of whether the tag is in state "A" or state "B". The expectation in such scenarios is to be able to read all tags within the field of view (FOV) of the reader antenna, regardless of the inventoried flag state. The power level of the RFID electromagnetic exciter field is manually tuned to limit the reading of static tags which might be far from the system. But as more time is spent by an RFID reader to inventory the tags in the FOV of its steerable antenna, the opportunities increase to miss a tag that is crossing in an area that is not then covered by the antenna beam. This problem becomes particularly noteworthy when many tags are present. It also detracts from the ability of the portal to focus attention on the tags which are actually crossing through the portal (as opposed to static tags which are not in motion).

In some cases, improved performance can be achieved by executing a combination of RFID tag reads using different sessions, power levels and beam directions so as to maximize RFID portal accuracy in a dense tag population. The unique combination of those read cycles allows an RFID portal to detect the surrounding tags while focusing on the crossings tags.

According to one aspect of examples of the technology disclosed herein, increased power leading levels can be achieved by synchronizing multiple readers to point in the same direction at the same time. The individual power levels of each synchronized RFID reader can also be simultaneously increased.

Figure 5:
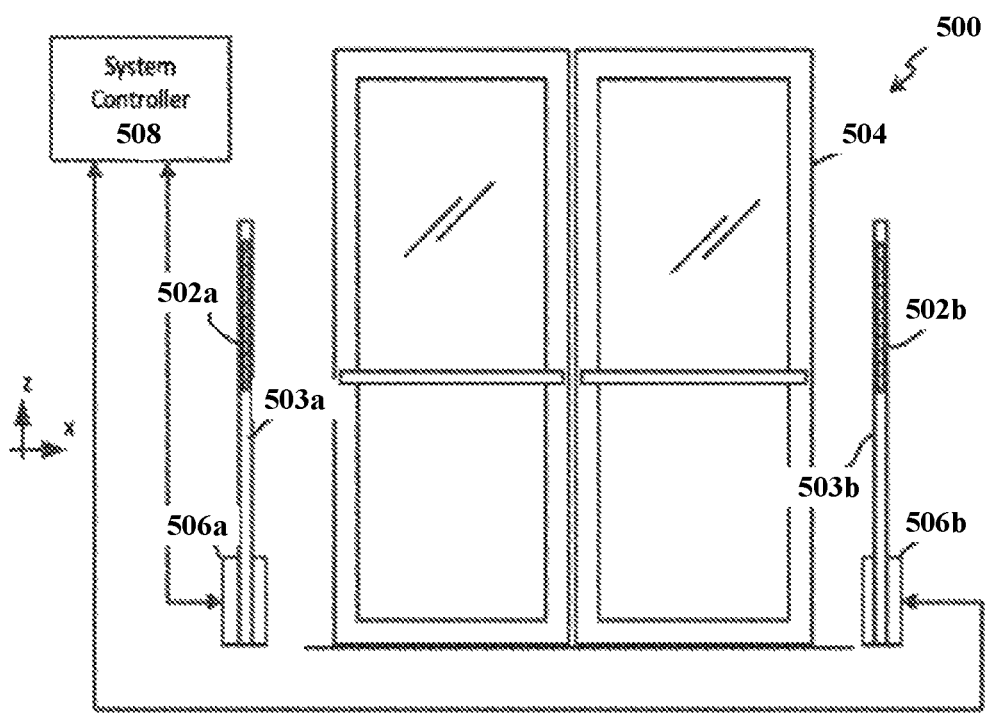
FIG. 5 is a plan view of an RFID portal system at a choke point.
Figure 6:
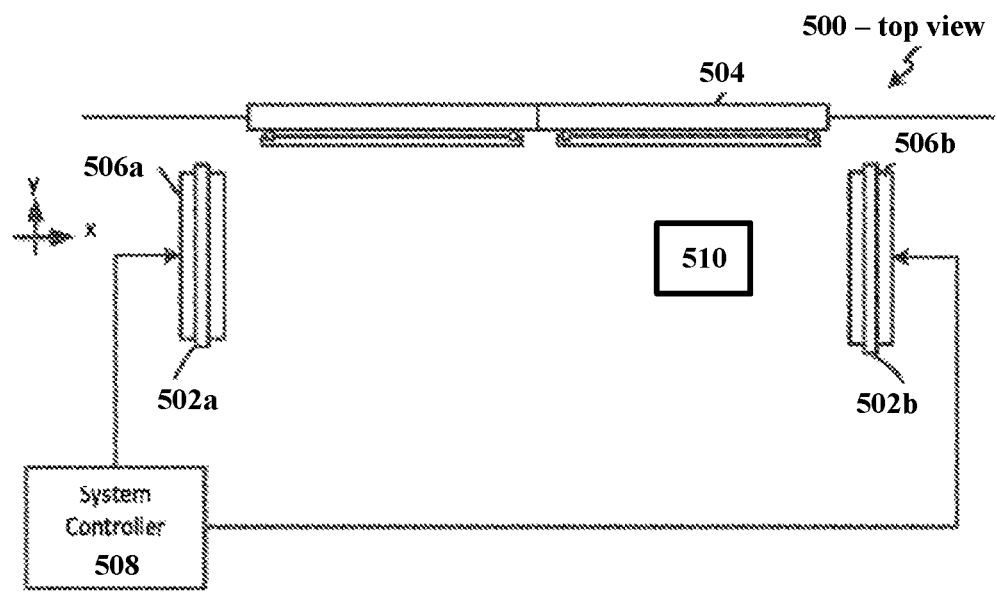
FIG. 6 is a top view of the RFID portal system in FIG. 5.
Figure 7:
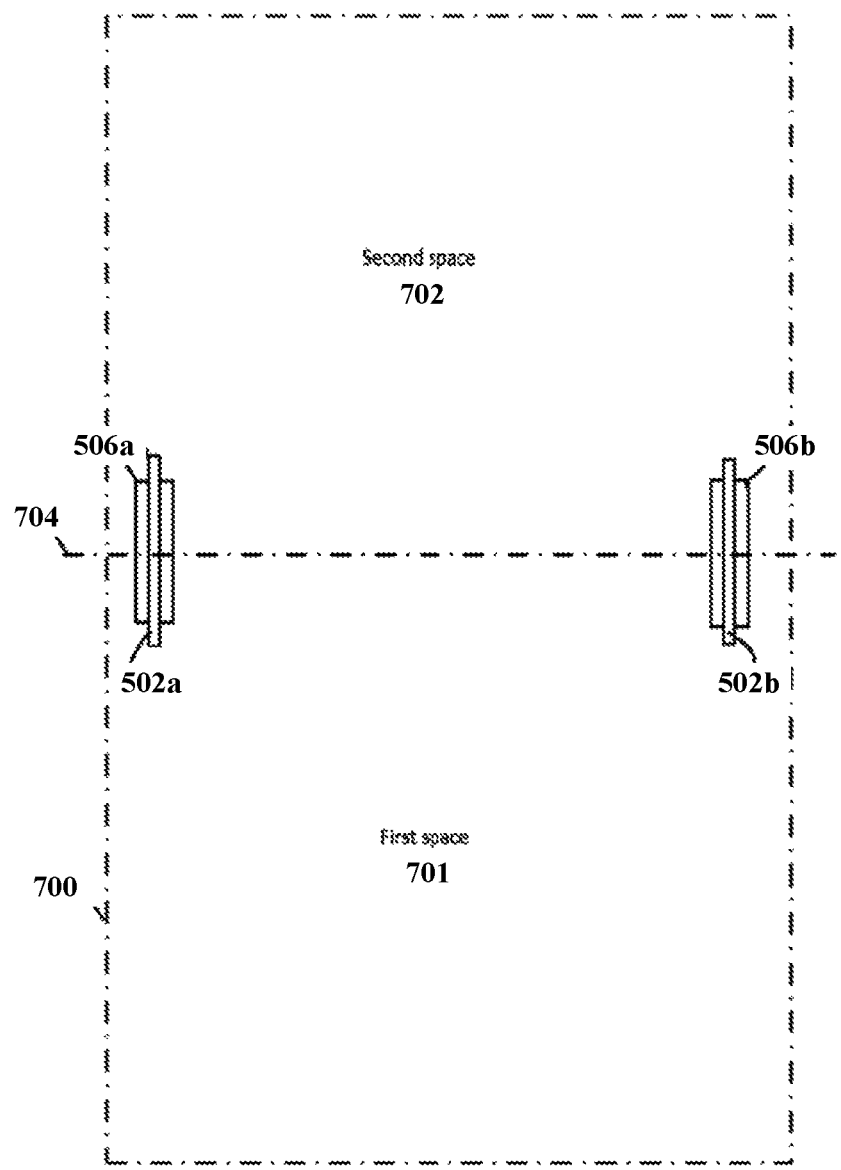
FIG. 7 is an example of portal zones surrounding an RFID portal system.

In FIGS. 5-7 there is shown an RFID portal system 500 (plan view in FIG. 5, top view in FIG. 6), which is useful for understanding certain aspects of the invention. The RFID portal system includes two RFID readers 506*a*, 506*b* and each of them are respectively attached to antennas 502*a*, 502*b* mounted on sides of the portal. An RFID reader as referenced herein is capable of generating RFID tag exciter signals to control and elicit responses from one or mote of a plurality of RFID tags in a RFID portal zone. The RFID exciter signals can also serve as a source of power for energizing the RFID tags. The exciter signals generated by the RFID reader and responses received by the reader will be in accordance with an RFID system standard that is now known or known in the future. The RFID tag reader will also be capable of detecting, identifying and or processing one or more the responses from the plurality of RFID tags in a portal zone. The RFID readers can include suitable interface circuitry to facilitate communications with a system controller 508 as described below. For example, the interface circuitry can facilitate communication of information regarding detected responses received from RFID tags. Such interface circuitry can also facilitate reception of interrogation commands and or antenna beam control commands from the system controller.

In the arrangement 500 shown, the antennas are mounted on pedestals 503*a*, 503*b*, but the technology disclosed herein is not limited in this regard. The antennas could be mounted in the ceiling or in the ground, and the method described herein would still be applicable. There is no restriction regarding the type of antennas which are used to produce the required field patterns. However, in this example 500, antennas 502 are understood to be beam steerable so that multiple different antenna beam directions can be obtained from a single antenna 502*a*, 502*b*. Control over the required antenna field patterns can be facilitated by the RFID readers as noted above. Also, two antennas 502*a* and 502*b* are shown in FIG. 5, but it should be understood that the technology disclosed herein is not limited in this regard. The inventive arrangements descried herein could be implemented using a single beam steerable antenna.

The RFID portal system 500 can be placed in the vicinity of an exit point 504 in a facility where goods and items must pass through in order to transition from one space inside the facility to a second space which is outside of the facility. In the example shown in FIG. 5 and FIG. 6, the choke point 504 is a doorway, but the technology disclosed herein is not limited in this regard. The choke point can also be a wide exit such as those seen in shopping malls, which is open to another interior space which is not a part of the facility. The RFID readers 506a, 506 can be operated under the command of a system controller 508, such as server 124, which facilitates the detection of one or more RFID tags 510 within a field of view of each antenna as hereinafter described.

As shown in FIG. 7, the RFID portal system 100 will define a boundary 704 that separates a portal zone 700 into a first interior space 701, which may be located inside a facility such as a retail store, and a second exterior space 702, which is considered to be outside the retail store. The portal zone generally defines the area in which tire RFID portal system 500 is capable of detecting and reading RFID tags. The portal zone 700 is shown as a regular rectangular shape in FIG. 7 for ease of illustration, but it should be understood that the actual shape of the zone can be somewhat irregular, as it will depend on the portal reader, antenna system and environmental factors which defines the field of view of the system. The first space 701 and the second space 702 are respectively physical spaces or areas of the portal zone 700 defined on opposing sides of the boundary as shown. The RFID portal system will (1) inventory all tags crossing the portal between the first and second space, (2) provide enough reads per crossing tag to determine directionality of such movement, (3) inventory all static tags in the portal zone surrounding the portal.

In order to understand the operation of the RFID portal system 500, it is useful to note some basic features of the EPC Gen2 type RFID tags. Each EPC Gen2 compliant tag can selectively have one of two states "A" and "B" The "A" state is the default stale for such tags; but under predetermined conditions, the tags can be caused to transition to the "B" state. The tag will remain in the "B" state for some period of time, known as a persistence time. When the tag times-out of the "B" state, it will automatically revert to the "A" state.

Referring now to FIG. 8, an EPC Gen2 tag facilitates up to four different sessions: Session 0, Session 1, Session 2, and Session 3. For convenience, these sessions are sometimes referred to as S0, S1, S2, and S3. As shown in FIG. 8, some of these sessions have a different persistence time as compared to other sessions. The persistence time can also be affected by whether or not the tag is energized or excited by an electromagnetic RFID reader field. An RFID reader will select which session is to be used during a particular inventory cycle. The flag state "A" or "B" for each of session S0, S1, S2, and S3 can be controlled independently of the flag state set in other sessions.

As used herein, the phrase "inventory round" refers to each instance in which RFID tags within the portal zone are activated using RF activation signals front the RFID reader The inventory rounds performed by the portal can be Single Target rounds or Dual target rounds. When an RFID reader performs a Single Target round, it reads only "A" state tags and then transitions each such tag to its "B" state. This cycle is performed as often as is practically possible until all tags are read. In a Dual Target round, the reader reads all tags in a "A" state tags and then transitions each such tag to its "B" state, then reads all tags in a "B" state into the "A" state, and the cycle is repealed as long as necessary.

In some approaches, operating an RFID portal generally involves three cycles, including a Detection Cycle, a Sampling Cycle and a Survey Cycle. In examples of the technology disclosed herein, the method includes a Base Reader Mode, which represents a reading mode at a power level selected to only read tags within a limited area in the vicinity of the RFID portal. The algorithm controlling the Base Reader Mode may be selected to optimize tag detection and reading accuracy in the area near the portal by cycling between different sessions, search modes, power levels and/or beam directions. The base reader algorithm driving the Base Reader Mode can be, but is not limited to, the system and method described in U.S. Pat. No. 9,519,811, which provides a Detection Cycle, a Sampling Cycle and a Survey Cycle.

Examples of the technology disclosed herein provide a second mode of operation, which is an additional High-Power Reader Mode. The High-Power Reader Mode initiates a tag reading cycle at a greater RF power level than the Base Reader Mode. When operating in the High-Power Reader Mode, at the cycle which reads into the store interior, i.e. the First space 701, multiple readers positioned to read into the store (first space 701) are turned to high-power mode. At the same time, the multiple readers are synchronized to point at the same target zone. For example, if multiple readers initiate high-power reading while into the store (the first space 701), it will provide positive reinforcement of the data collected by RF signals aimed at different places in space. If a tag is positioned very close to a human tn the first space 701, for example by deliberate shielding of the tag, when the tag passes through the first space 701 the amount of voltage received by the that tag can be that double or triple the voltage received into the tag at normal power levels.

Similarly, it is also desirable to synchronize multiple readers which are pointing in a direction outside of the store, i.e. towards second space 702. For example, if two or three of the total as ail able readers are simultaneously activated when the beams are pointing out of the store into the second space 702 (outside the store), this would enable the reader to read tags that are being stolen once they are out of the store. In addition to increased powered achieved by the directional synchronization of the readers, the RF power levels of each of the readers can also be individually increased. This arrangement will also advantageously serve to read tags on the back of the neck and behind the back of the thief as they leave the store.

The directional synchronization of multiple readers reading in a given direction can result in a potential increase of 4 to 9 dB more energy being received by a tag in the targeted zone. Synchronizing transmissions from multiple leaders which point at the same target zone can result in a greater amount of RF energy directed in that direction. This results in a greater amount of energy induced in the tag, which results in a higher probability the tag will have sufficient energy to turn on. This makes it possible to read a greater number of "hard-to-read" tags that may otherwise concealed by proximity to a human body. When readers are synchronized to increase and target delivered RF power, a tag otherwise shielded by extremely close proximity to a human may receive sufficient RF energy to power on the tag, which would not occur at lower power levels.

For cases where a thief is exit the store wearing multiple garments with RFID tags, the inventive arrangement and algorithm can result in a much higher percentage read rate of tags.

In practice, it is not typical to not have a first reader transmitting from a first pedestal at the same time a second reader is transmitting at the same time to the center beam at the same height. One solution is to ensure that a first patch antenna located close to the ground on a first pedestal is transmitting at the same time a second patch antenna, located higher front the ground that the first antenna and on a second pedestal, is transmitting. Alternatively, in another embodiment, this problem can be solved by providing a right-hand circularly polarized antennas in a first pedestal, and a left-hand circularly polarized antenna on a second nearby pedestal.

The High-Power Reader Mode, which can be directed alternatively into the store's interior and then to the exterior area of the store, advantageously helps to enable the reader to detect and read "hard-to-read" tags How ever, in addition to reading am hard-to-read tags, the reader is able to read a higher number of tags at a greater distance into the store's interior (First space 701) and also reads also a higher number of tags in the area which may be located beyond the portal, outside of the exit (second space 702). The number of tags detected and read in High-Power Reader Mode may greatly exceed the number of tags detected in the Base Reader Mode. In particular, the increased number of tag reads extending into the interior of the store will pick up statically positioned inventory located inside the store, which can be of sufficient numbers to mask the detection of a tag being deliberately concealed.

Figure 9:
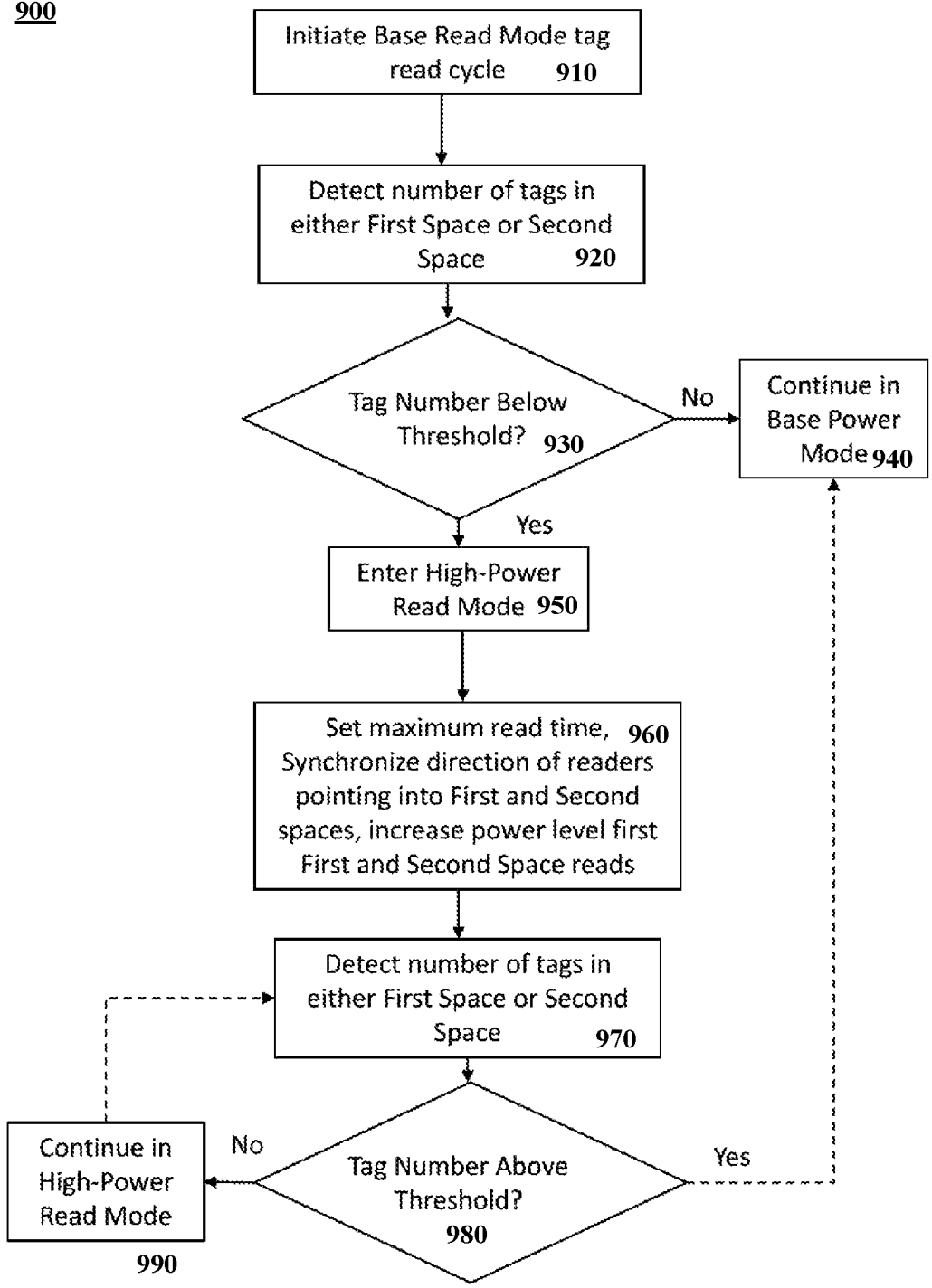
FIG. 9 is a flow chart flow chart of a method of electronic article surveillance, in accordance with examples of the technology disclosed herein.

To address this problem, examples of the technology disclosed herein can proceed as in the method 900 depicted in FIG. 9. After initiation of the RFID system 500 in base read mode (910) the RFID system 500 detects some total number of tags in a target areas, e.g., a first space 701 or a second space 702 (920). The RFID system 500 determines if the number is below a threshold (930). Note that "below a threshold," "meet a threshold," "under a threshold." and similar phrases are intended to convey the same meaning herein unless explained otherwise. When a threshold or greater number of tags is detected or read in the target zone, the RFID system follows the "No" path from step 930 and continues in the base power mode (940).

When the number of tags detected meets or exceeds the threshold, the RFID system 500 follows the "Yes" path from step 930 and enters the High-Power Read Mode (950). In such cases, the RFID readers are directed (960) to read the inside of the store in high-power mode, the algorithm limits the maximum amount of time that in which tags are read during each cycle. This maximum time will be selectable and variable, and can be calculated based on the number of tags read from the previous read cycle directed into the store. If the number of tags being read in the area inside the store (970) exceeds a predetermined threshold ("Yes" path from 980, then the system pauses the high-power detection cycle, and commences the algorithm initiating Base Reader Mode, which does not include a high-power detection window.

When operating in High-Power Reader Mode, when the number of tags visible inside the store during the high-power detection cycle is a manageable number according to the threshold (e.g. less than 300) ("No" path from step 980, the RFID system continues in the High-Power Read Mode (990). In some such examples, the RFID system 500 uses the following logic: 1. For reading A flags inside the store, set a timeout from 50 ms to 250 ms, set the session flag to either session 2 or 3, where session 2 or 3 as selected continues to he used for "inside the store" reads. 2. Start reading A flags located inside the store using all available readers (e.g. three readers) using Single Target Mode to read the A Flags. 3. If the cycle time is over there are still A flags remaining to be read inside the store, then the readers continue to read only A flags during the next "inside the store" reading cycle. But if all A flags have been read, then the next pass reading inside the store will then read the B flags. This logic will continue reading some or all of the A flags until done, and then switching to the B flags and reading them until done.

For reading cycles for detecting tags outside of the store, the same pattern is followed, but will use the other of session 2 or 3 which was used for reading inside the store. Every cycle we also have the same pattern for the tags outside the store, but it will use the session 2 or 3 that was not used for the tags inside the store.

The cycle described above will continue until the number of detected tags in the field of view (e.g. those inside the store) exceed a predetermined threshold, which indicates that there are too many visible tags to successfully utilize a high-power mode cycle to read "hard-to-read" tags. This causes the reader to exit out of the High-Power Reader Mode, and the next cycle commences the steps performed by the base reader algorithm, which does not have a high-power reader cycle. The system continues to operate according to the base reader algorithm until the number of tags detected and read m the area inside the store drops back to a manageable level (i.e the pre-determined threshold). When a lower number of tags are present in an area, high-power read cycles can be utilized to read "hard-to-read" tags.

By using the Single Target Mode, examples of the technology disclosed herein do not re-read the same tags until ail of the tags have been read, in both the inside and outside areas. But by switching to reading the B state tags the B state tags will read them all again after they were initially read in the A state. In addition to reading far in and far out, the invention contemplates interleaving the readings in-between the pedestals with high-power in session 1 or session 0.

One advantage of such an approach is that the RFID system 500 will continue to read the located at a relatively long distance both inside and outside the store, but at a reduced rate. In conventional approaches, the tag reads that may be achieved might only read the tags once in the far in and far out read patterns. Examples of the technology disclosed herein allow the tags in these inside and outside areas to be read repeatedly as long as the number of tags does not exceed a predetermined threshold. For example, the tags located both inside the store and outside the store can be read over and over as long as there are not a large number of tags located too close to the pedestal (e.g. hundreds of tags) which would revert the algorithm to the base reader mode which does not have a high-power read window. Examples of the technology disclosed herein can be extended to synchronize more than one pedestal/exit solution at a time. For example, if two to ten exit systems are placed besides each other, then all exit systems can be coordinated to read into the store at the same time to maximize the power received by the tags inside the store. If additional readers are installed inside the store, including those readers that max be installed in the floor or ceiling, then these readers could also be synchronized to the logic described above.

Figure 10:
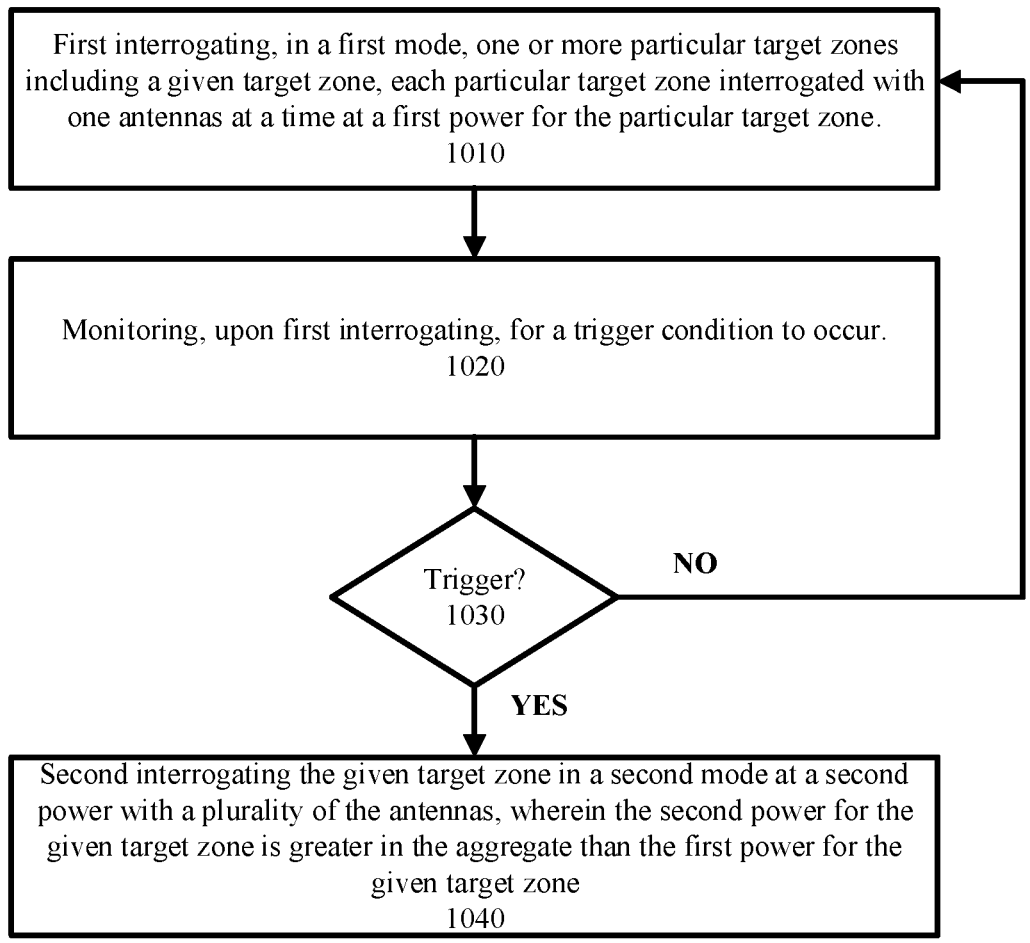
FIG. 10 is a flow chart of a method of electronic article surveillance, in accordance with examples of the technology disclosed herein.
Figure 12:
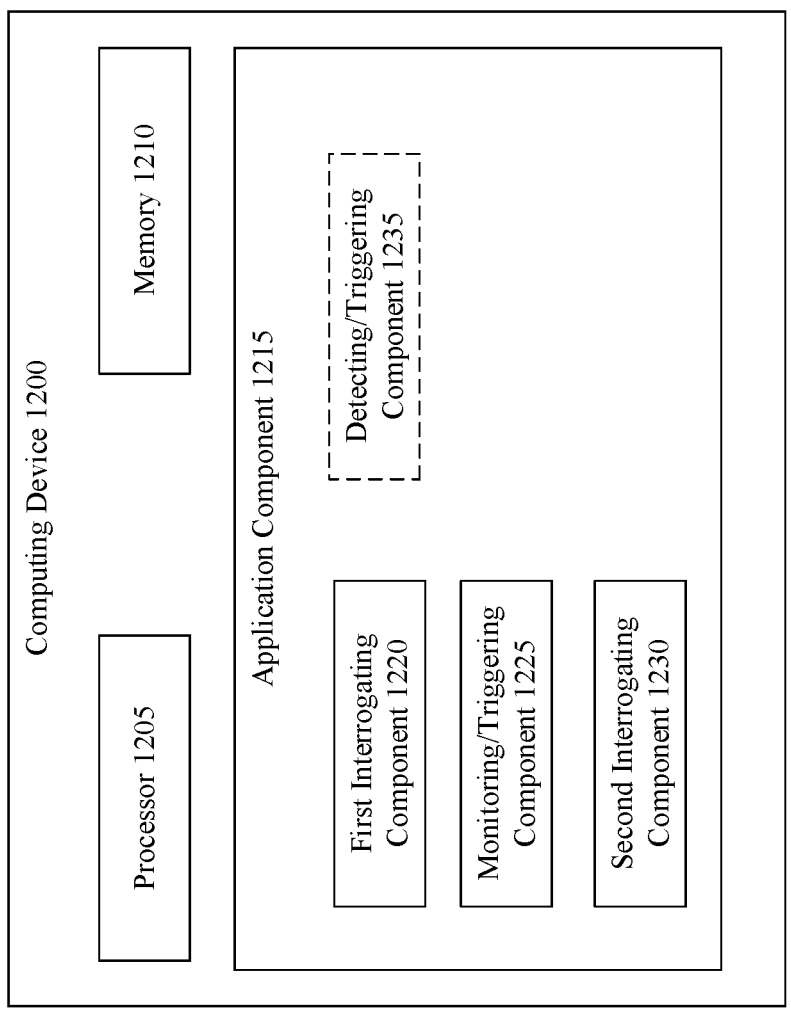
FIG. 12 is an illustration of a computing device including components for performing the function of examples of the technology disclosed herein.

Referring to FIG. 10 and FIG. 12, in operation, RFID system 500 max perform a method 1000 of electronic article surveillance, by such as via execution of application component 1215 by processor 1205 and or memory 1210—wherein application component 1215, processor 1205, and/or memory 1210 are components of computing device 1200. Computing device 1200 can be one or more of tag 200, tag reader 300, and server 400.

Consider an RFID system, such as RFID system 500, including a plurality of non-co-located interrogation antennas. Each antenna is independently controllable by the RFID system 500 to interrogate one or more of a plurality of target zones one target zone at a time for the presence of RFID tags 510 of the RFID system 500 in each interrogated target zone.

An RFID system 500 can first interrogating, by the system in a first mode, one or more particular target zones of the plurality of target zones including a given target zone, each particular target zone interrogated with one of the antennas at a time at a first power for the particular target zone—Block 1010. In a continuing example, the RFID system 500 operates in a lower power Base Read mode and 500 detects some number number of tags in a target areas, e.g., a first space 701 or a second space 702.

In another example, referring to FIG. 12, computer device 1200, processor 1205, memory 1210, application component 1215, and/or first interrogating component 1220 may be configured to or may comprise means for first interrogating, in a first mode, one or more particular target zones of the plurality of target zones including a given target zone, each particular target zone interrogated with one of the antennas at a time at a first power for the particular target zone.

The RFID system, starting upon first interrogation, monitors for a trigger condition to occur—Block 1020. In the continuing example, monitoring includes detecting a number of RFID tags 510 of the system during a given round, and the trigger condition comprises the number being over a first threshold, in this case, 250. In other examples, the trigger condition can be based on an output of one or more non-RFID sensors 150 of the system being over a threshold of the one or more non-RFID sensors 150. For example, infra-red sensors can track the number of people entering and exiting the portal 504. As another example. Bluetooth-enabled mobile communication devices and beacon sensors 150 can be used to monitor the number of people, or carts, or other inventory robots, entering or exiting through the portal 504. As another example, the trigger condition can be a schedule.

In another example, referring to FIG. 12, computer device 1200, processor 1205, memory 1210, application component 1215, and/or monitoring triggering component 1225 may be configured to or may comprise means for monitoring for a trigger condition to occur.

In response to the trigger condition not occurring ("NO" path from node 1030), the RFID system continues the first interrogation. In the continuing example, at first over 250 tags 210 are counted by the system during live first interrogation.

In response to the trigger condition occurring ("YES" path from node 1030), the RFID system second interrogates the given largest zone in a second mode at a second power with a plurality of the antennas—BLOCK 1040 In the continuing example, after a first round, the RFID system detects only 217 RFID tags and both RFID readers 500*a*, 506*b* are directed to read the inside of die store (zone 701) in high-power mode. The system 500 limits the maximum amount of time that in which tags are read during each cycle in the second mode. This maximum time will be selectable and variable, and can be calculated based on the number of tags read from the previous read cycle directed into the store.

In another example, referring to FIG. 12, computer device 1200, processor 1205, memory 1210, application component 1215, and or second interrogating component 1230 may be configured to or may comprise means for second interrogating the given target zone in a second mode at a second power with a plurality of the antennas.

Figure 11:
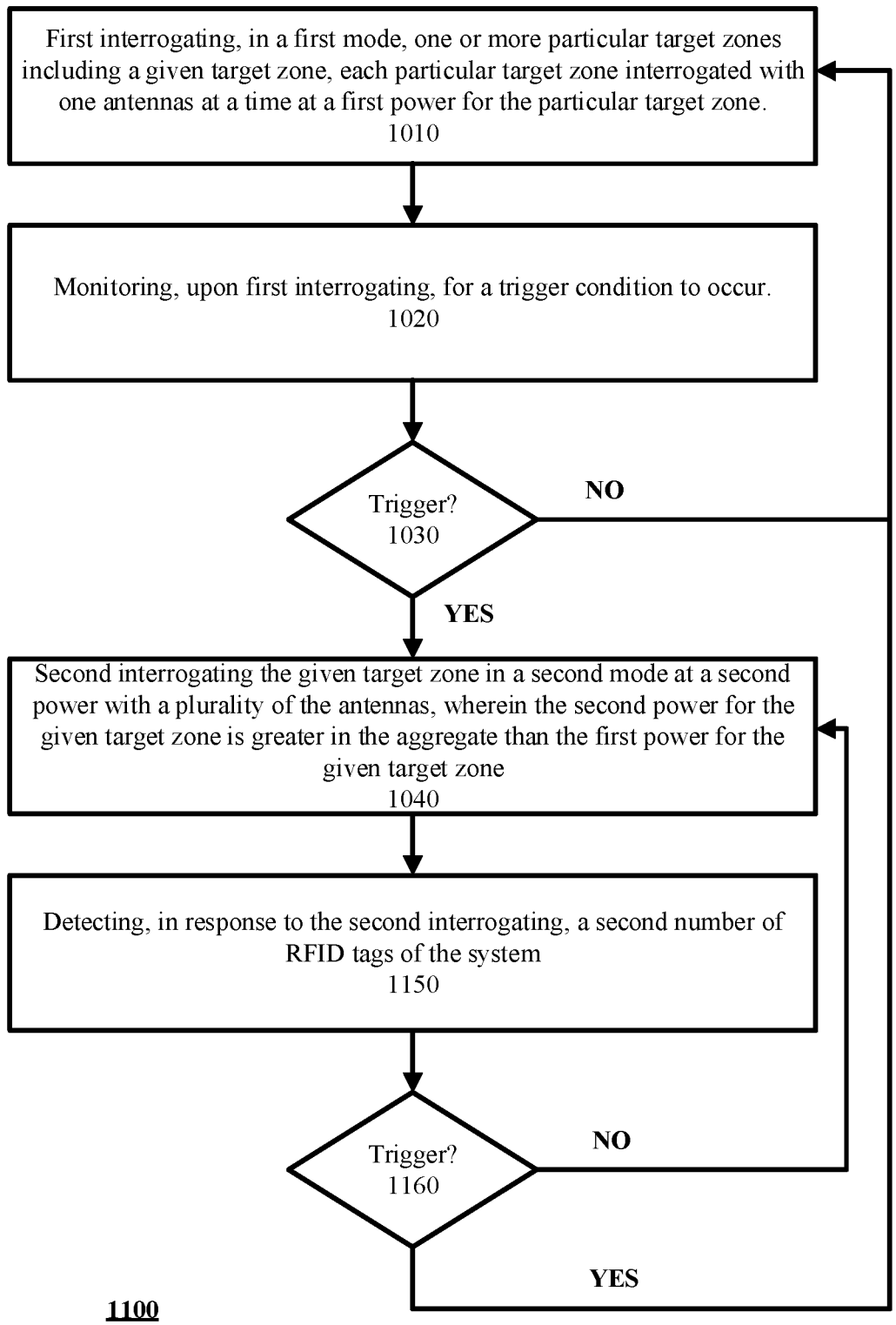
FIG. 11 is a flow chart of a method of electronic article surveillance, in accordance with examples of the technology disclosed herein.

Referring to FIG. 11 and FIG. 12, in operation, RFID system 300 may perform a method 1100 of electronic article surveillance, by such as via execution of application component 1215 by processor 1205 and or memory 1210—wherein application component 1215, processor 1205, and/or memory 1210 are components of computing device 1200. Computing device 1200 can be one or more of tag 200, tag reader 300, and server 400. In such methods 1100, Blocks 1010, 1020, 1030, and 1040 are performed as described above in connection with FIG. 10 for a trigger condition including the number of RFID tags 510 detected during the first interrogation number being over.

In such methods 1100, the RFID system 500, in response to the second interrogating, detects a second number of RFID tags of the system—Block 1150. While the number of tags detected during the second interrogation has not exceeded a second threshold ("NO" path from 1160), the RFID system 500 continues the second interrogating. When the number of lags detected during the second interrogation is greater than a second threshold ("YES" path from 1160), the RFID system 500 ends the second interrogation and returns to interrogating using the first mode. In the continuing example, the RFID system 500, using a second threshold of 300, at first continues to detect only 217 RFID tags, but then in a subsequent rounds of the second interrogating detects 278, and then 302 RFID tags. Upon detecting 302 RFID tags, the RFID system returns to the first interrogation.

In another example, referring to FIG. 12, computer device 1200, processor 1205, memory 1210, application component 1215, and or detection triggering component 1235 may be configured to or may comprise means for detecting, in response to the second interrogating, a second number of RFID tags of the system, and upon detecting a number of tags above the second threshold, ending the second interrogation and returning to interrogating using the first mode.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and or C, and may include multiples of A, multiples of B, or multiples of C. Specifically, combinations such as "at least one of A, B, or C" "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of electronic article surveillance (EAS), comprising:
in a radio frequency identification (RFID) system comprising a plurality of non-co-located interrogation antennas, each antenna independently controllable to interrogate one or more of a plurality of target zones one target zone at a time for a presence of RFID tags of the system in each interrogated target zone:
first interrogating, by the system in a first mode, one or more particular target zones of the plurality of target zones including a given target zone, each particular target zone interrogated with one of the antennas at a time at a first power for the particular target zone;
monitoring, by the system upon first interrogating, for a trigger condition to occur;
in response to the trigger condition not occurring, continuing, by the system, the first interrogation in the first mode; and
in response to the trigger condition occurring, second interrogating, by the system, the given target zone in a second mode at a second power with a plurality of the antennas at a same time in synchronization, wherein the second power for the given target zone is greater in aggregate across the second interrogating antennas than the first power for the given target zone.

2. The method of claim 1, wherein:
the monitoring comprises detecting a number of RFID tags of the system during a given round; and
the trigger condition comprises the number being over a first threshold.

3. The method of claim 2, further comprising: second detecting, by the system in response to the second interrogating, a second number of RFID tags of the system; and for the second number greater than a second threshold, 1) ending the second interrogation in the second mode, and 2) third interrogating in the first mode.

4. The method of claim 1, wherein the given target zone is a portal zone between a first area and a second area.

5. The method of claim 1, wherein the trigger condition comprises an output of one or more non-RFID sensors of the system being over a threshold of the one or more non-RFID sensors.

6. The method of claim 1, wherein the trigger condition comprises a schedule.

7. The method of claim 1, wherein at least one antenna of the plurality of the second interrogating antennas is a steerable beam antenna under control of the system and not directed to the given target zone during the first interrogation.

8. A electronic article surveillance (EAS) system, comprising:
at least one RFID system controller;
a plurality of RFID readers in communication with the at least one RFID system controller; and
a plurality of non-co-located interrogation antennas, each antenna independently controllable by one of the plurality of RFID readers to interrogate one or more of a plurality of target zones one target zone at a time;
the system operative to:
first interrogate, in a first mode, one or more particular target zones of the plurality of target zones including a given target zone, each particular target zone interrogated with one of the antennas at a time at a first power for the particular target zone;
monitor, upon first interrogating, for a trigger condition to occur;
in response to the trigger condition not occurring, continue the first interrogation in the first mode; and
in response to the trigger condition occurring, second interrogating the given target zone in a second mode at a second power with a plurality of the antennas at a same time in synchronization, wherein the second power for the given target zone is greater in aggregate across the second interrogating antennas than the first power for the given target zone.

9. The system of claim 8, wherein:
the monitoring comprises detecting a number of RFID tags of the system during a given round; and
the trigger condition comprises the number being over a first threshold.

10. The system of claim 9, further operative to: second detect, in response to the second interrogating, a second number of RFID tags of the system; and for the second number greater than a second threshold, 1) end the second interrogation in the second mode, and 2) third interrogate in the first mode.

11. The system of claim 8, wherein the given target zone is a portal zone between a first area and a second area.

12. The system of claim 8, wherein the trigger condition comprises an output of one or more non-RFID sensors of the system being over a threshold of the one or more non-RFID sensors.

13. The system of claim 8, wherein the trigger condition comprises a schedule.

14. The system of claim 8, wherein at least one antenna of the plurality of the second interrogating antennas is a steerable beam antenna under control of the system and not directed to the given target zone during the first interrogation.

15. An electronic article surveillance (EAS) apparatus, comprising:
means for first interrogating, in a first mode, one or more particular target zones of a plurality of target zones including a given target zone, each particular target zone interrogated with one of a plurality of antennas at a time at a first power for the particular target zone;
means for monitoring, upon first interrogating, for a trigger condition to occur;
means for continuing, in response to the trigger condition not occurring, the first interrogation in the first mode; and
means for second interrogating, in response to the trigger condition occurring, the given target zone in a second mode at a second power with a plurality of the antennas at a same time in synchronization, wherein the second power for the given target zone is greater in aggregate across the second interrogating antennas than the first power for the given target zone.

16. The apparatus of claim 15, wherein:
the means for monitoring comprises means for detecting a number of RFID tags of the system during a given round; and
the trigger condition comprises the number being over a first threshold.

17. The apparatus of claim 16, further comprising: means for second detecting, by the system in response to the second interrogating, a second number of RFID tags of the system; and for the second number greater than a second threshold, 1) ending the second interrogation in the second mode, and 2) third interrogating in the first mode.

18. The apparatus of claim 15, wherein the given target zone is a portal zone between a first area and a second area.

19. The apparatus of claim 15, wherein the trigger condition comprises an output of one or more non-RFID sensors being over a threshold of the one or more non-RFID sensors.

20. The apparatus of claim 15, wherein the trigger condition comprises a schedule.

\* \* \* \* \*